United States Patent
Messick, Jr. et al.

(10) Patent No.: US 9,169,074 B2
(45) Date of Patent: Oct. 27, 2015

(54) VARIABLE WIDTH DRIVE OPENINGS FOR CONVEYOR BELT

(71) Applicant: Cambridge International Inc., Cambridge, MD (US)

(72) Inventors: George Howard Messick, Jr., Cambridge, MA (US); Michael Robert Franzoni, Cumberland, RI (US); Thomas O. Perdue, Salisbury, MD (US)

(73) Assignee: CAMBRIDGE INTERNATIONAL, INC., Cambridge, MD (US)

( * ) Notice: Subject to any disclaimer, the term of this patent is extended or adjusted under 35 U.S.C. 154(b) by 0 days.

(21) Appl. No.: 14/554,704

(22) Filed: Nov. 26, 2014

(65) Prior Publication Data

US 2015/0151919 A1    Jun. 4, 2015

Related U.S. Application Data

(60) Provisional application No. 61/909,488, filed on Nov. 27, 2013.

(51) Int. Cl.
| | |
|---|---|
| *B65G 17/18* | (2006.01) |
| *B65G 17/40* | (2006.01) |
| *B65G 23/06* | (2006.01) |
| *B65G 17/08* | (2006.01) |

(52) U.S. Cl.
CPC .............. *B65G 23/06* (2013.01); *B65G 17/08* (2013.01); *B65G 17/083* (2013.01); *B65G 17/40* (2013.01); *B65G 2812/02376* (2013.01)

(58) Field of Classification Search
CPC .... B65G 17/08; B65G 17/083; B65G 17/086; B65G 2812/02; B65G 2812/2089; B65G 2812/02376; B65G 2812/02396; B65G 17/38; B65G 17/385; B65G 17/40; B65G 23/06
USPC .................. 198/848, 851, 852, 853
See application file for complete search history.

(56) References Cited

U.S. PATENT DOCUMENTS

| | | | | |
|---|---|---|---|---|
| 2,862,602 | A * | 12/1958 | Greer et al. | 198/848 |
| 5,950,807 | A * | 9/1999 | Greer | 198/850 |
| 6,202,833 | B1 * | 3/2001 | Greer | 198/851 |
| 7,721,877 | B2 * | 5/2010 | Maine et al. | 198/848 |
| 7,975,840 | B2 | 7/2011 | Messick, Jr. et al. | |
| 2007/0080048 | A1 * | 4/2007 | Messick et al. | 198/852 |
| 2009/0078544 | A1 * | 3/2009 | Messick et al. | 198/834 |
| 2013/0092513 | A1 * | 4/2013 | Record et al. | 198/853 |

* cited by examiner

*Primary Examiner* — Mark A Deuble
(74) *Attorney, Agent, or Firm* — Buchanan Ingersoll & Rooney PC

(57) ABSTRACT

A variable spaced flat wire conveyor belt system includes a plurality of spaced tractive rods; a plurality of rows of flat wire wickets defining a plurality of drive links and a plurality of support links, the drive links including at least a plurality of first drive links, a plurality of second drive links, and a plurality of third drive links; and at least one drive sprocket configured to engage the plurality of drive links; wherein the first drive links have a first height and a first transverse spacing defining a first drive opening, the second drive links have a second height and a second transverse spacing defining a second drive opening, and the third drive links have a third height and a third transverse spacing defining a third drive opening; wherein the second drive opening and the third drive opening are progressively greater, respectively, than the first drive opening.

13 Claims, 4 Drawing Sheets

VARIABLE WIDTH DRIVE OPENINGS FOR CONVEYOR BELT

TECHNICAL FIELD

The disclosure herein is directed to a conveyor belt, more particularly to a flat wire conveyor belt having variable spaced wire links, and still more particularly, to a flat wire conveyor belt system having variable spaced wire links defining progressively wider drive openings.

BACKGROUND

Flat wire conveyor belts have been in the market for many years. Flat wire conveyor belts are generally low maintenance and when positively driven with sprockets have little to no lateral shifting.

A known flat wire conveyor belt is shown in U.S. Pat. No. 7,975,840, assigned to Cambridge International, Inc., the entire contents of which are hereby incorporated by reference. The conveyor belt therein includes a plurality of spaced tractive rods disposed in succession and transversely with respect to a direction of travel and a plurality of rows of pickets transversely disposed with respect to the direction of travel, and interconnecting the succession of rods. Each row of pickets is comprised of a plurality of links, each link connecting a rod with a following rod in the succession.

The pickets comprise a plurality of links; however, not all the links within a single picket are identical. More particularly, in order to strengthen the outer edges of the conveyor belt, the edges of the picket are provided with links having a first spacing or mesh size and the middle portion of the belt therebetween is provided with links having a second spacing or mesh size. Hence, the pattern of openings in belt provides both narrow openings for sprocket engagement and wider openings for product support that results in reduced material usage and belt weight, yet still provides sufficient strength for product support.

When such a flat-wire conveyor belt is subjected to large temperature changes, however, expansion/contraction of the overall belt width relative to that of the sprockets and shaft may result in potential binding and belt/sprocket disengagement due to the differential expansion/contraction between the belt and the sprockets and shaft.

Accordingly, there exists a need in the marketplace for a flat wire conveyor belt having a lighter weight and reduced quantity of required material, while still retaining its strength, and which provides for fixed sprocket placement on the conveyor shaft when the belt is subjected to large temperature changes.

SUMMARY

The disclosure herein is directed to a variable spaced flat wire conveyor belt system including a plurality of spaced tractive rods; a plurality of rows of flat wire wickets transversely disposed with respect to a direction of travel and interconnecting the plurality of spaced tractive rods, each wicket having a uniform thickness dimension throughout a width of the conveyor belt; and each of the rows of wickets defining a plurality of drive links and a plurality of support links disposed in between the plurality of drive links. The plurality of drive links include at least a plurality of first drive links, a plurality of second drive links, and a plurality of third drive links, each of the drive links having a longitudinal height and a transverse spacing; and at least one sprocket having a plurality or sprocket teeth configured to engage the drive links. The plurality of first links have a first height and a first transverse spacing, the plurality of second links have a second height and a second transverse spacing, and the plurality of third links have a third height and a third transverse spacing, the second spacing and the third spacing being progressively greater than the first spacing.

BRIEF DESCRIPTION OF THE DRAWING FIGURES

The disclosure herein will become more readily apparent to those skilled in the art upon reading the following detailed description, in conjunction with the appended drawings in which.

DETAILED DESCRIPTION OF THE PREFERRED EMBODIMENTS

Figure 1:
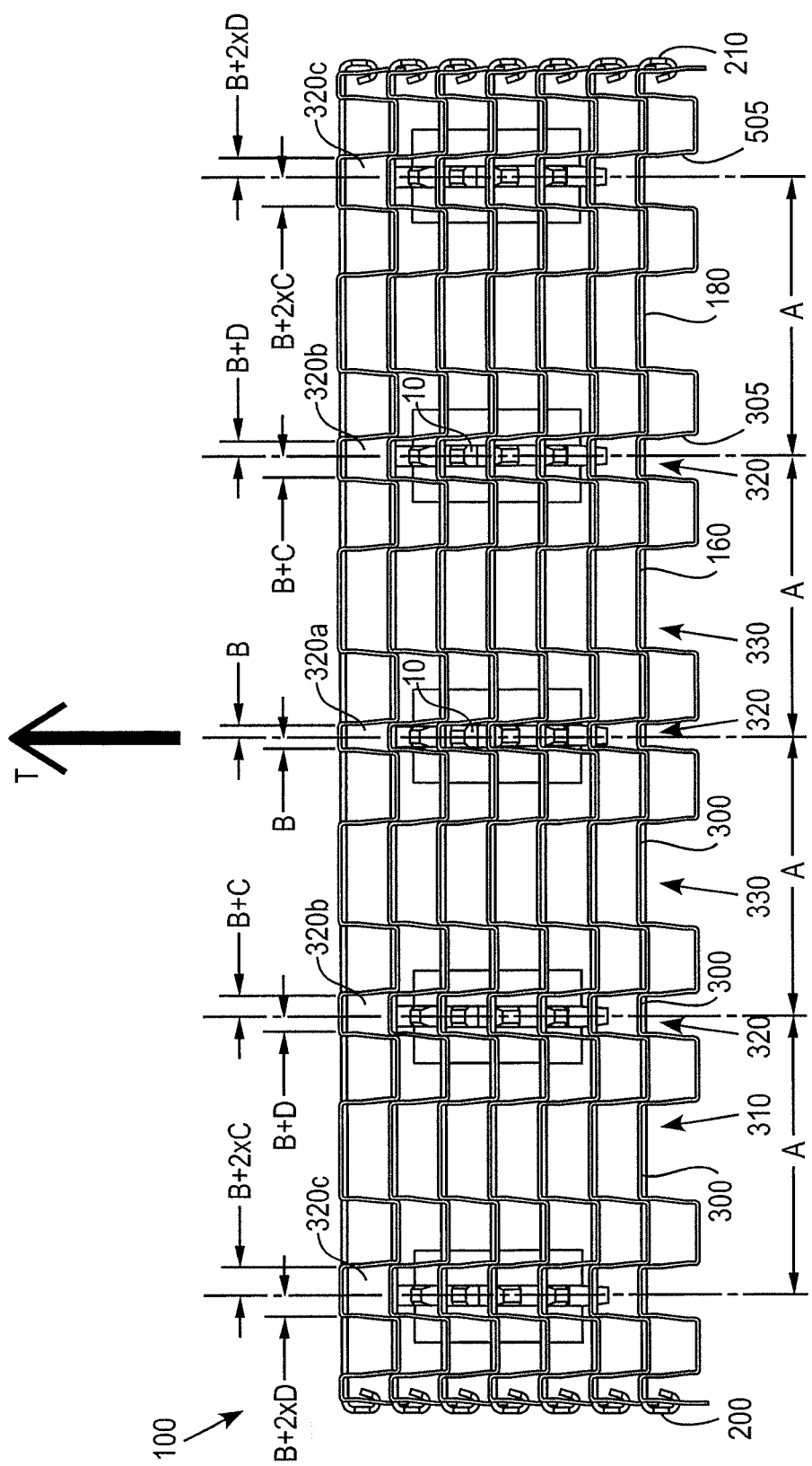
FIG. 1 is a top elevational view of a segment of a flat-wire conveyor belt according to a first exemplary embodiment of the disclosure herein.

A conveyor belt in accordance with an exemplary embodiment of the disclosure herein is shown generally in FIG. 1 by reference numeral 100. Conveyor belt 100 preferably comprises a flat wire conveyor belt including a plurality of spaced tractive rods 180 disposed in succession and transversely with respect to a direction of travel T as represented by arrow T of belt 100, each rod 180 having two ends 200 and 210. Preferably, the connecting rods 180 are bent around to define a U-shape termination resulting in a finished, clinched end at each rod end 200, 210. The use of such clinched rod ends is further described in U.S. patent application Ser. No. 14/537,415, filed Nov. 10, 2014, the entire contents of which are hereby incorporated by reference.

Belt 100 includes a plurality of rows of wickets or pickets 160 transversely disposed with respect to the direction of travel T, and interconnecting the succession of rods 180. Each row of pickets 160 is comprised of a plurality of links 300, each link connecting a rod 180 with a following rod in the succession. The links 300 define openings 310 in the belt 100 as produced by the assembly of the pickets 160, thereby providing a repeating pattern of generally more narrow openings, or drive openings 320, intended for engagement with sprockets 10 and generally wider openings, or support openings 330, which are sufficient for product support and belt structure but allow for reduced material usage and belt weight. The more narrow drive openings 320 can be formed on fixed center distances or on variable-spaced centers, depending on the particular application.

More particularly, the pickets 160 are formed such that the width of the drive openings 320 can be varied in a progressive pattern in order to allow for fixed sprocket placement on the conveyor shaft when the belt 100 is subjected to large temperature changes that result in expansion/contraction of the overall belt width relative to that of the sprockets and/or shaft. In one preferred construction according to the disclosure, a belt 100 will have sprocket openings 320 that gradually increase in width in a pattern that extends outward from the most center sprocket opening or openings 320. Other variations of this pattern can also be constructed whereby the most narrow drive openings 320 are positioned at one edge of the belt 100 or at some other desired reference location across the belt width, and the adjacent drive openings progressively vary, either wider or narrower, from the most narrow drive opening. The pattern of progressively wider drive openings 320 begins from a reference opening 320a and extends outward in one or both directions across the remaining width of the belt. With such belt construction, the more narrow drive openings act to restrain the belt from objectionable side-to-side movement, while the progressively wider drive openings permit the belt to expand and/or contract in width with temperature changes without interfering with the fixed position of the sprockets, and thus eliminates potential binding and belt/sprocket disengagement.

With reference to FIG. 1 and in accordance with a first preferred embodiment of the disclosure, pickets 160 comprise a plurality of links 300; however, not all the links 300 within a single picket are identical. The drive links 305 defining the drive openings 320 in the belt are located at a fixed and equal center-to-center nominal dimension "A". The centermost drive opening 320a in the belt 100 is typically the narrowest, and thereby acts to limit excessive lateral movement of the belt 100 when the belt 100 is engaged with a sprocket. In the illustrated exemplary embodiment of the disclosure, the center drive opening 320a can be described as having a width of 2 times a nominal dimension "B". The next drive openings 320b of the belt, extending outward in both directions, are incrementally wider than the referenced center opening 320a. This increase in width can be described as an addition of a nominal dimension "C" on one side of the centerline of the opening 320b, i.e., B+C, and an addition of a nominal dimension "D" on the opposite side of the centerline of the opening 320b, i.e., B+D. Depending on the application and need, dimension "C" may be greater than, lesser than, or equal to dimension "D". In the illustrated exemplary embodiment, dimension "C" is greater than dimension "D". In a similar fashion, each successive drive opening 320 across the width of the belt increases in width by an increment of nominal dimension "C" on one side of the centerline and an equal increment of dimension "D" on the other side of the centerline. That is, the next drive openings 320c of the belt, extending outward in both directions, are incrementally wider than the referenced center opening 320a and the adjacent opening 320b. This increase in width can be described as a further addition of a nominal dimension "C" on one side of the centerline of the opening 320c, i.e., B+2C, and a further addition of a nominal dimension "D" on the opposite side of the centerline of the opening 320c, i.e., B+2D.

By virtue of the above construction, the width of the drive openings 320 in the belt 100 vary in a regular, controlled pattern that corresponds with the expected expansion and/or contraction of the belt 100 resulting from temperature changes, but without causing interference with the drive sprockets.

Additional embodiments of the disclosure can also include constructions where the reference drive sprocket opening 320a of nominal width 2 times "B" is located to one edge of the belt or at some location between the belt center and belt edge. The variable width drive opening pattern described herein can also be developed around drive openings within the belt that are positioned on unequal regular or irregular center distances.

Figure 2:
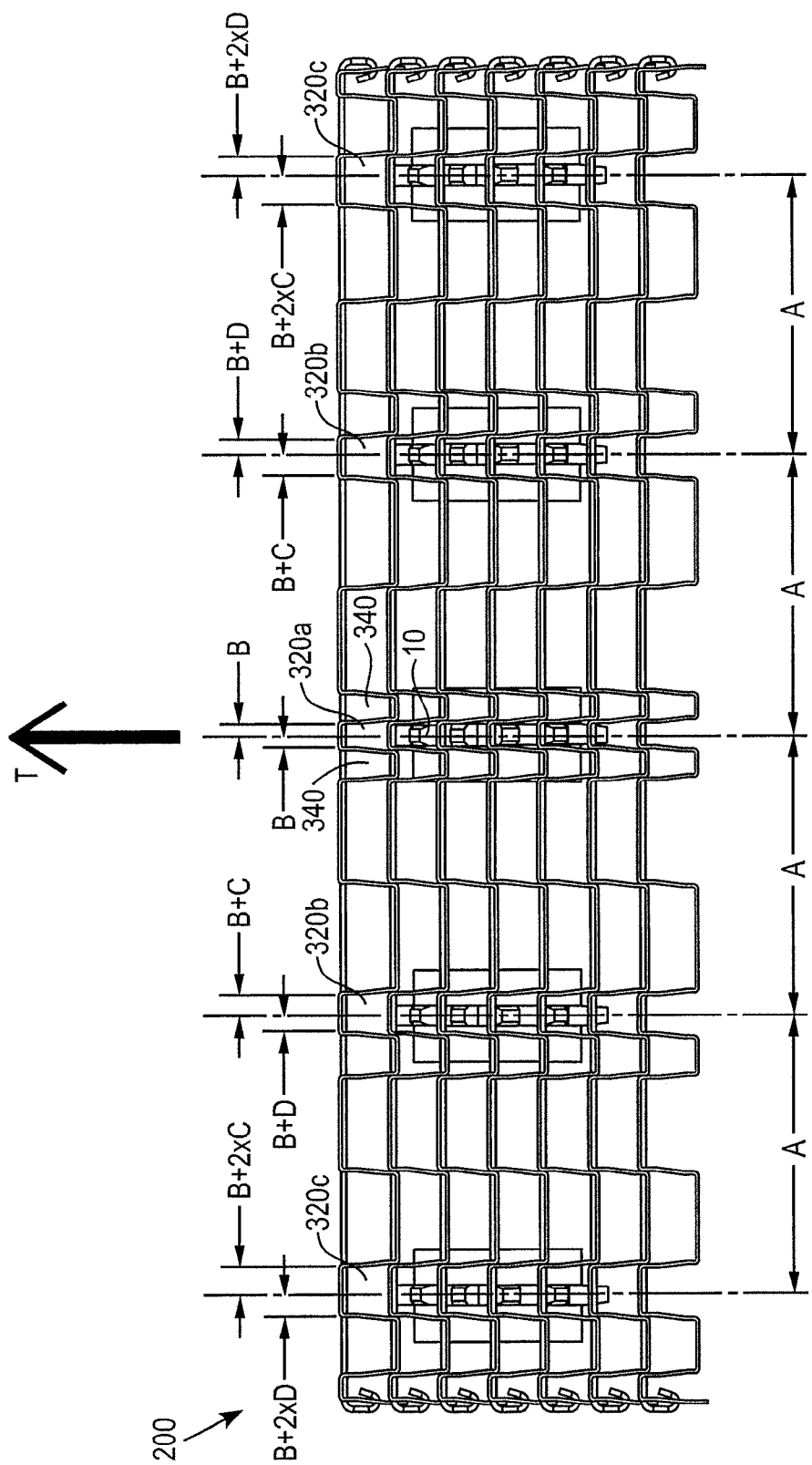
FIG. 2 is a top elevational view of a segment of a flat-wire conveyor belt according to a second exemplary embodiment of the disclosure herein.
Figure 3:
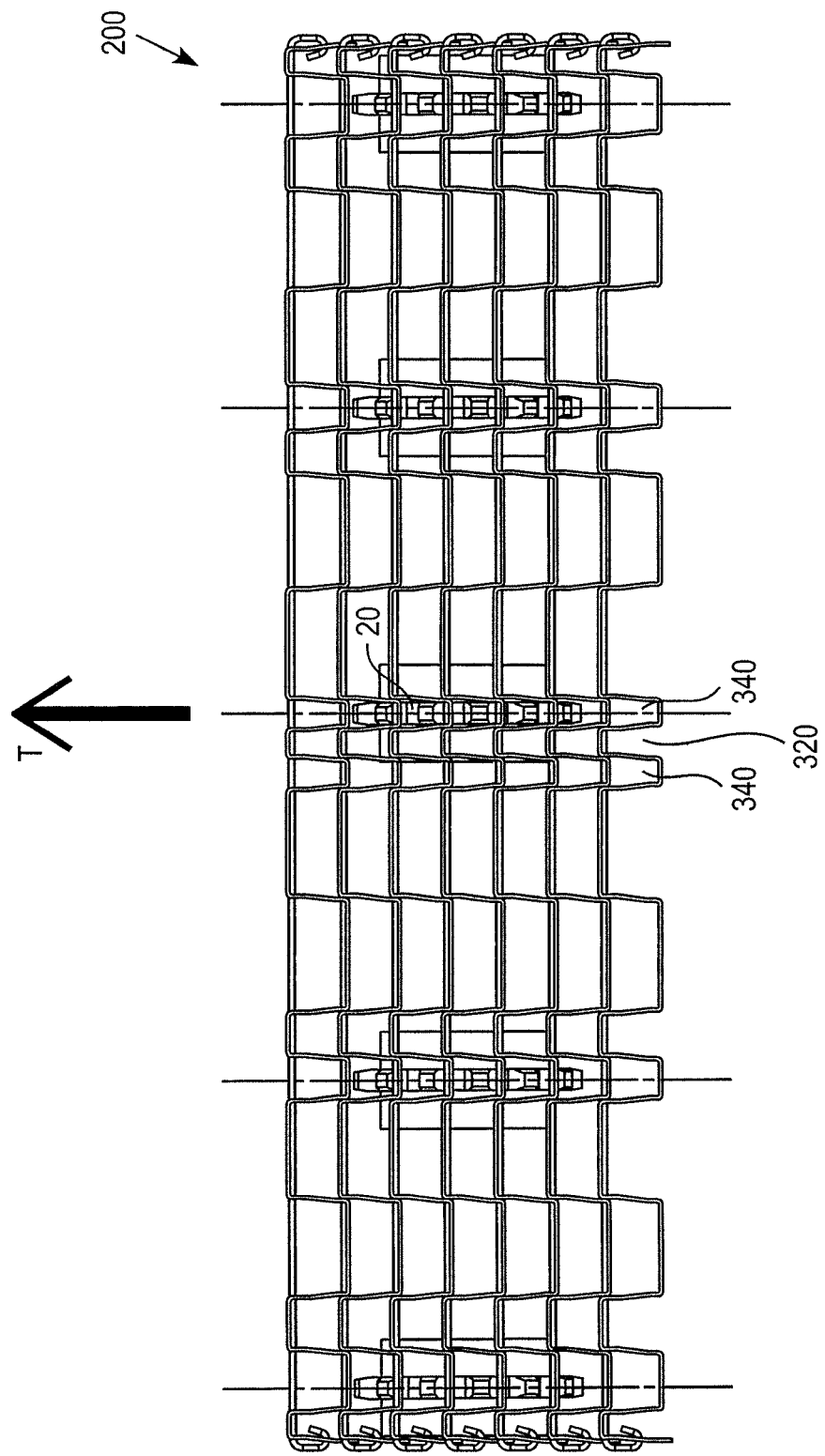
FIG. 3 is a further top elevational view of the flat-wire conveyor belt shown in FIG. 2.
Figure 4:
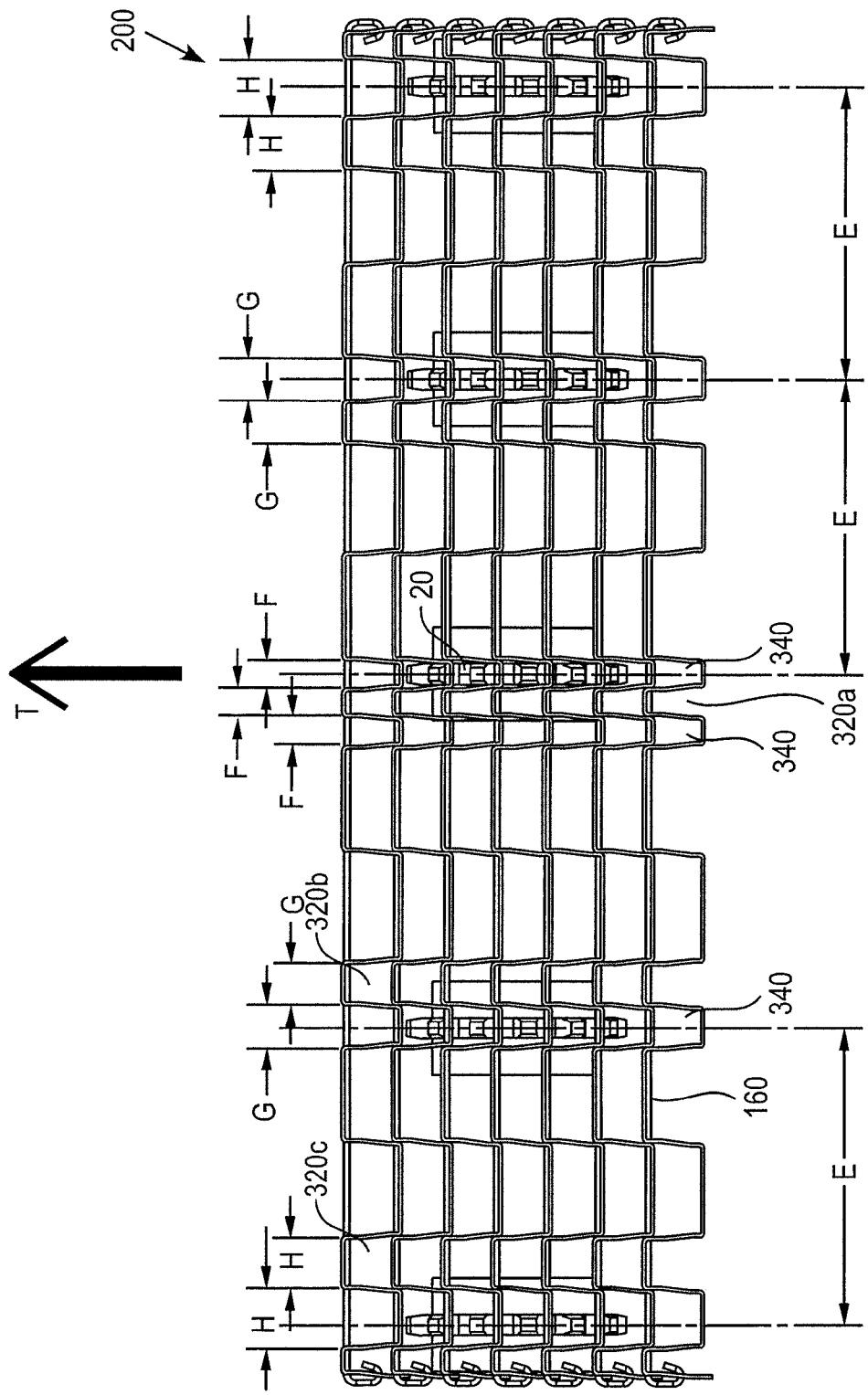
FIG. 4 is a further top elevational view of the flat-wire conveyor belt shown in FIG. 2.

A further exemplary embodiment of the disclosure is shown in FIGS. 2-4. The flatwire conveyor belt shown generally by reference numeral 200 is also formed from pickets 160 and clinched rods 180, but also includes idler openings 340 immediately adjacent to the main drive openings 320 of the belt 200 that are of similar or equal width to the drive openings 320 (see FIG. 2). That is, in the illustrated embodiment, the drive openings 320 define variably increasing widths "F", "G", "H", and the idler openings 340 also display variably increasing widths "F", "G", "H" (see FIG. 4). The openings 340 provide defined locations for idler (non-driving) sprockets 20 (see FIGS. 3 and 4), which also allow for fixed sprocket placement on the conveyor shaft when the belt is subjected to large temperature changes that result in expansion/contraction of the overall belt width relative to that of the sprockets and shaft. The narrow opening(s) 320 located at or near the center of the belt when combined with a fixed sprocket act to limit lateral belt movement, thus aid in belt tracking at a different point on the conveyor than the location of the main drive sprockets.

In the illustrated exemplary embodiment, an idler sprocket opening 340 is shown on both sides of the center drive sprocket location to provide additional flexibility in the placement of the most inboard idler sprocket 20. However, the pickets 160 of the belt can also be formed such that adjacent idler opening 340 for the idler sprocket 20 is placed either to the immediate right or the left of the center drive opening 320a, but not on both sides. Still further, idler sprocket openings 340 can have widths that are based on a belt expansion/contraction that is completely different or unrelated to the expansion/contraction that occurs at the location of the drive sprockets, thus the variable width openings for the idler sprockets in the belt would be different from the variable width openings for the main drive sprockets in the same belt.

The above-described exemplary embodiment of the disclosure illustrates preferred relationships between links within a picket configured for use with a toothed sprocket. Such descriptions are not limited to the illustrated lineal pitch, and can of course be used with any desired pitch. Similarly, the pickets and hence the conveyor belts can be manufactured to any preferred width depending upon the desired application.

While the present invention has been described with respect to a particular exemplary embodiment of the disclosure herein, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

The invention claimed is:

1. A variable spaced flat wire conveyor belt system comprising:
    a plurality of spaced tractive rods;
    a plurality of rows of flat wire wickets transversely disposed with respect to a direction of travel and interconnecting said plurality of spaced tractive rods, each said wicket having a uniform thickness dimension throughout a width of the conveyor belt; each of said rows of wickets defining a plurality of drive links and a plurality of support links disposed in between said plurality of drive links, said plurality of drive links comprising at least a plurality of first drive links, a plurality of second drive links, and a plurality of third drive links, each of said drive links having a longitudinal height and a transverse spacing; and
    at least one drive sprocket having a plurality of sprocket teeth configured to engage the plurality of drive links;
    wherein said plurality of first drive links have a first height and a first transverse spacing defining a first drive opening, said plurality of second drive links have a second height and a second transverse spacing defining a second drive opening, and said plurality of third drive links have a third height and a third transverse spacing defining a third drive opening;

wherein said second drive opening and said third drive opening are progressively greater, respectively, than said first drive opening.

2. The variable spaced flat wire conveyor belt system according to claim 1, wherein said first drive openings are centrally disposed along said wickets.

3. The variable spaced flat wire conveyor belt system according to claim 1, wherein said first drive openings are disposed along an edge of the conveyor belt.

4. The variable spaced flat wire conveyor belt system according to claim 1, wherein said first drive openings have a center-to-center first dimension.

5. The variable spaced flat wire conveyor belt system according to claim 4, wherein said second drive openings have a center-to-center second dimension, the second dimension being greater than the first dimension, the second dimension corresponding to the first dimension plus a first additional width on a first side of a centerline of the second drive openings and a second additional width on a second side of the centerline of the second drive opening.

6. The variable spaced flat wire conveyor belt system according to claim 5, wherein the first additional width is greater than, lesser than or equal to the second additional width.

7. The variable spaced flat wire conveyor belt system according to claim 1, further comprising a plurality of idler sprockets disposed on at least one side of the at least one sprocket.

8. The variable spaced flat wire conveyor belt system according to claim 7, further comprising a first idler opening disposed on at least one side of said first drive opening, said idler sprocket being configured to engage said first idler opening.

9. The variable spaced flat wire conveyor belt system according to claim 8, wherein said first idler opening is disposed on a first side and a second side of said first drive opening.

10. The variable spaced flat wire conveyor belt system according to claim 9, wherein the plurality of idler sprockets are disposed on only one side of the at least one drive sprocket.

11. The variable spaced flat wire conveyor belt system according to claim 8, further comprising a second idler opening disposed on at least one side of said second drive openings and a third idler opening disposed on at least one side of said third drive openings.

12. The variable spaced flat wire conveyor belt system according to claim 11, wherein said second idler openings and said third idler openings are progressively greater, respectively, than said first idler openings.

13. The variable spaced flat wire conveyor belt system according to claim 12, wherein said first idler openings, said second idler openings and said third idler openings are substantially equal in width to said first drive openings, said second drive openings and said third drive openings, respectively.

* * * * *